2,735,584

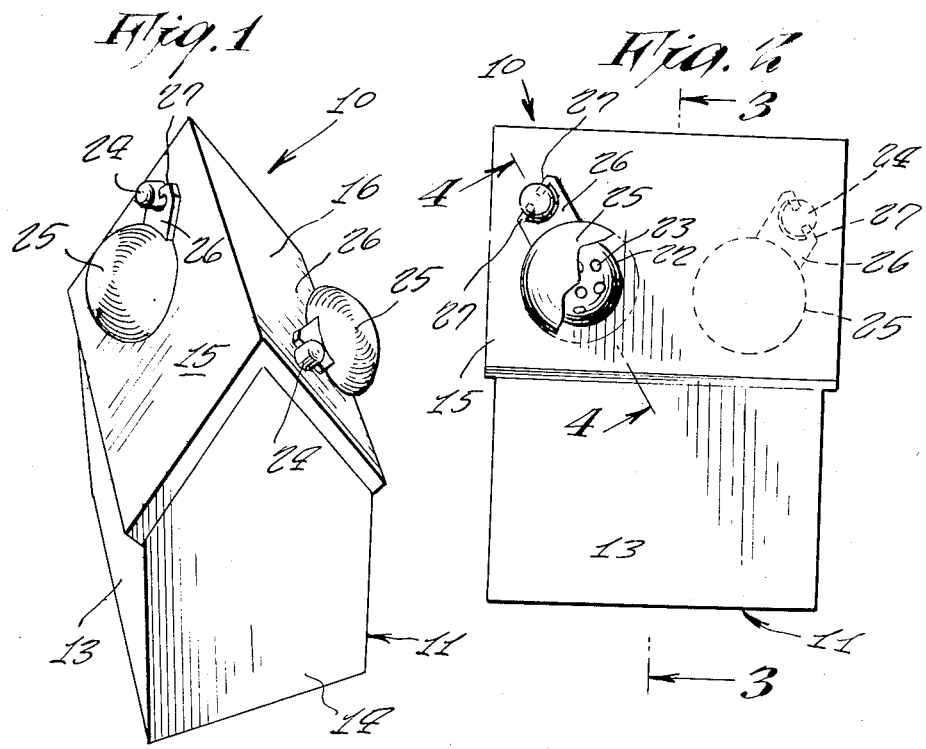
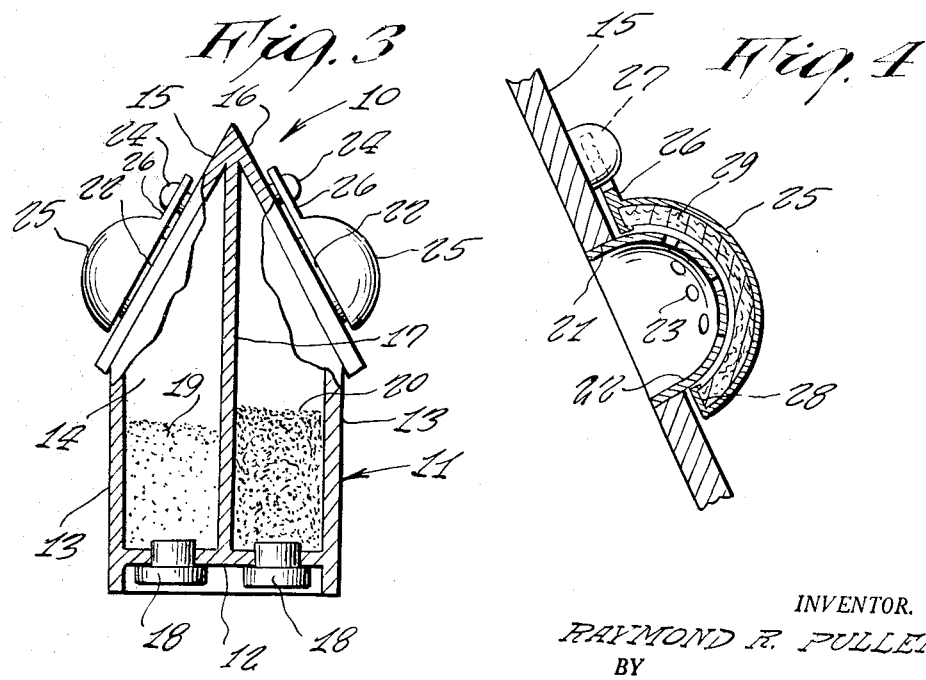

COMBINATION SALT AND PEPPER SHAKER

Raymond R. Pullen, Rumson, N. J.

Application April 27, 1953, Serial No. 351,365

1 Claim. (Cl. 222—142.1)

This invention relates to combination salt and pepper shakers.

It is an object of the present invention to provide a combination salt and pepper shaker having flippers which will automatically close and cover the shaker cap when the shaker is in an upright position.

It is another object of the present invention to provide a combination salt and pepper shaker of the above type wherein the angle of the pivot securing the flippers or covers prevents the flipper or cover on the opposite side from opening up when the shaker is in use.

Other objects of the present invention are to provide a combination salt and pepper shaker bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which:

Figure 1 is a perspective view of a combination salt and pepper shaker embodying the features of the present invention;

Fig. 2 is a side elevational view thereof;

Fig. 3 is a vertical sectional view taken along the line 3—3 of Fig. 2; and

Fig. 4 is a fragmentary sectional view taken along the line 4—4 of Fig. 2.

Referring now more in detail to the drawing, in which similar reference numerals identify corresponding parts throughout the several views, there is shown a combination salt and pepper shaker referred to collectively as 10, and including a hollow housing portion 11, substantially as illustrated.

The housing portion 11 consists of a bottom wall 12, side walls 13 and end walls 14, the bottom wall 12 being spaced upwardly from the bottom edges of the end and side walls, as shown in Fig. 3.

The housing 11 is simulative of a house, the upper portions of end walls 14 tapering to a point and supporting the roofed halves 15 and 16.

A partition 17 connects the bottom wall 12 and the apex of roof halves 15 and 16 and seals the interior of housing 11 into two compartments.

The bottom wall 12 in each of the inner compartments is provided with an opening which receives a plug 18, as shown in Fig. 3.

Salt 19 is disposed in one of the compartments and pepper 20 is disposed in the other.

The roof halves 15 and 16 are each provided with diagonally disposed openings 21 in which are secured shaker caps 22 (Fig. 4), the shaker caps 22 being perforated as at 23.

A pivot pin 24 is secured to the roof halves 15 and 16 above and to the left of each shaker cap 22, the pivot pin 24 being provided with diametrically opposed inwardly extending openings. A flipper or cover 25 fits over each of the shaker caps 22 and is integrally formed with a portion 26 extending towards pivot pins 24 and terminating in pins 27 which are rotatably received in the diametrically opposed openings of the pivot pins, substantially as illustrated. It will be noted that the portions 26 are provided with semi-circular cut outs at their ends which accommodate the pins 24. Thus, the flippers or covers 25 may be rotated upwardly about pins 27 from the shaker caps 22 and then rotated to one side about the pivot pins 24, permitting access to the shaker caps 22.

The peripheral edges of flippers 25 are integrally formed with flanges 28 which resiliently retain the sponge paper 29 disposed intermediate the flipper 25 and shaker caps 22, as shown in Fig. 4.

The pins 27 and the openings in the pivot pins 24 are such as to permit the pins 27 to be snapped into and out of engagement with the pivot pins 24.

It will be noted that the flippers 25 and shaker caps 22 are diagonally opposite and on each side of the roof 15, 16.

Thus, the flippers 25, one on each side of the roof, automatically close and cover shaker caps 22 when the shaker 10 is in an upright position.

When in use, the flippers 25 open and are thrown approximately 48 degrees over to the left, to allow the contents of the housing 11 to be shaken freely. When closed, the flippers 25 act as covers for the shaker caps 22. The angle of the pivot pins 24, it will be noted, prevents the flipper 25 from opening up on the opposite side when the shaker is in use.

The flippers 25, which are provided with a sponge paper seal 29, fit snugly over the holes in the shaker caps 22 acting as a shield. The flipper 25 and sponge paper seal 29 prevent dust, dirt and moisture from coming in contact with the contents of the shaker.

By having the shaker caps on the left hand side of the roof, the contents in the opposite side are prevented from spilling out when the shaker is tilted. When the shaker 10 is used at the stove, the cover or flippers 25 prevent any particles of grease from collecting on the shaker cap.

When filling shaker 10 from the bottom, hold one hand over the flipper caps and this will prevent the contents from coming out of the shaker caps.

While various changes may be made in the detail construction, it shall be understood that such changes shall be within the spirit and scope of the present invention as defined by the appended claim.

Having thus set forth and disclosed the nature of my invention, what is claimed is:

A combination salt and pepper shaker comprising hollow housing having a pitched roof closure at the top thereof and a bottom wall, a partition within said housing and extending from said bottom wall to the apex of said pitched roof and sealing off the interior of said housing into two separate compartments, removable means at the bottom of each of said compartments for filling the same, and a pair of diagonally opposite shaker caps provided in said pitched roof, and means for opening and closing said shaker caps, each of said shaker caps comprising a hemispherical perforated surface, said means of opening and closing said shaker caps comprising a hemispherical cover for each of said shaker caps, a pivot pin secured to said pitched roof above each of said shaker caps and displaced toward the adjacent end of said pitched roof, and means interconnecting said covers and said pivot pins, said means interconnecting said covers and pivot pins comprising an arm connected to the periphery of each of said covers and extending towards the adjacent pivot pin, the free end of said arm having a semicircular cutout adapted to receive the pivot pin, the ends of said arm terminating in a pair of laterally extending pins, said pivot pin having oppositely disposed openings receiving said pins, the lower peripheral edge of each of said covers having a laterally extending flange terminating in a second flange of substantially right angles thereto, and a hemispherical layer of resilient material disposed within each of said covers and secured in place by said flanges.

References Cited in the file of this patent

UNITED STATES PATENTS

| | | |
|---|---|---|
| 518,559 | Berry | Apr. 17, 1894 |
| 1,007,294 | Kraft | Oct. 13, 1911 |
| 1,021,483 | Reutter | Mar. 26, 1912 |
| 2,419,769 | Frank | Apr. 29, 1947 |